Patented Feb. 14, 1950

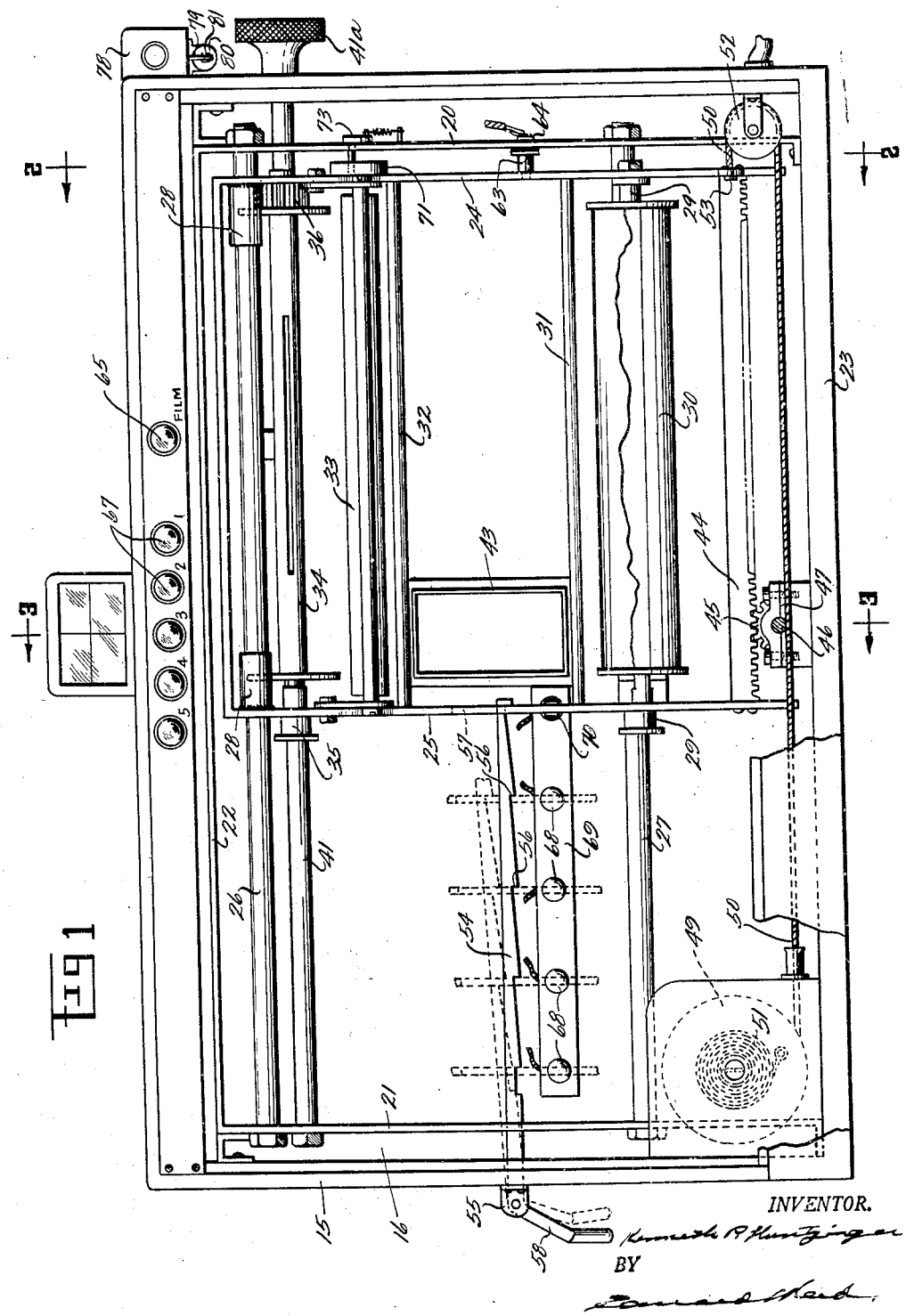

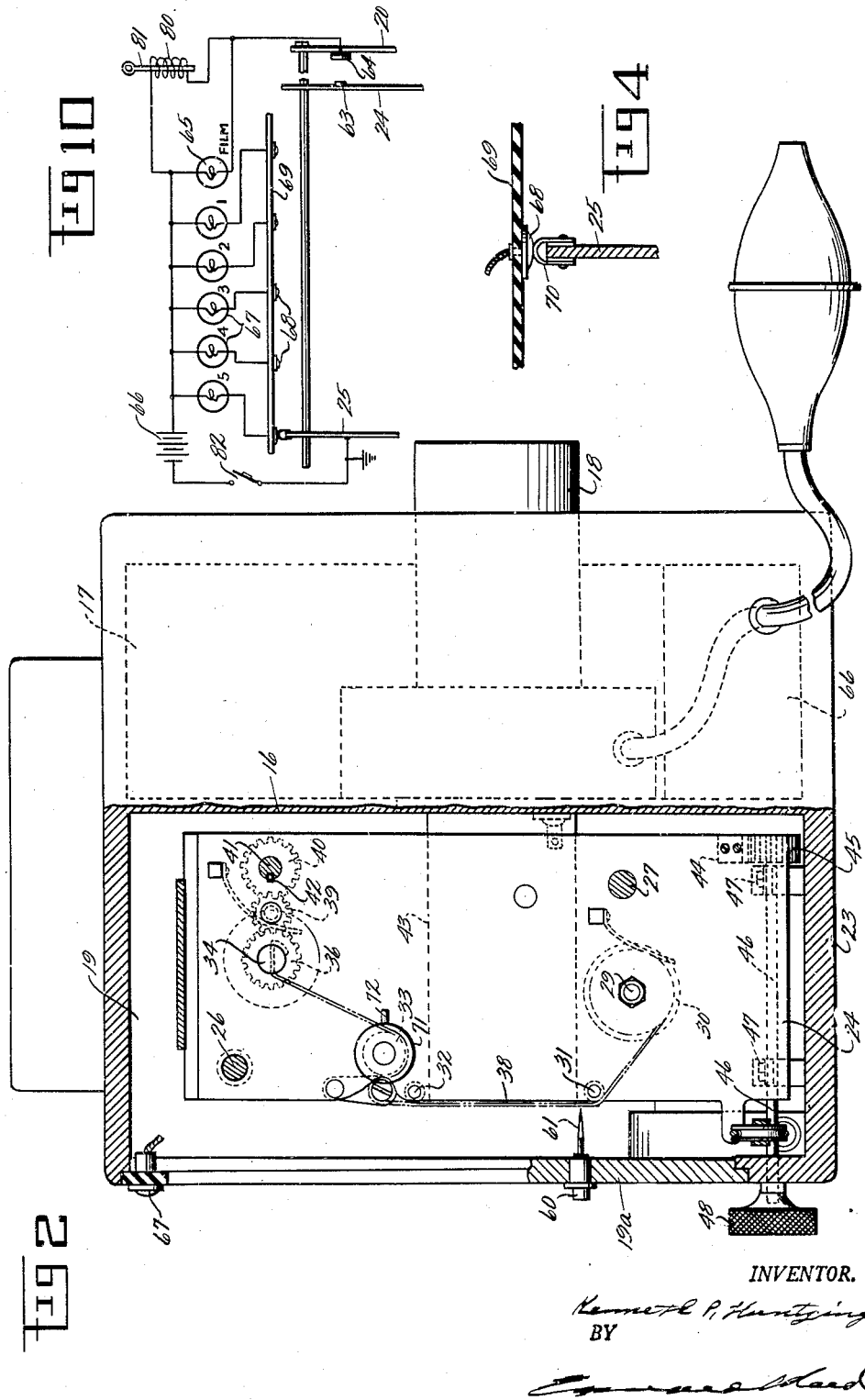

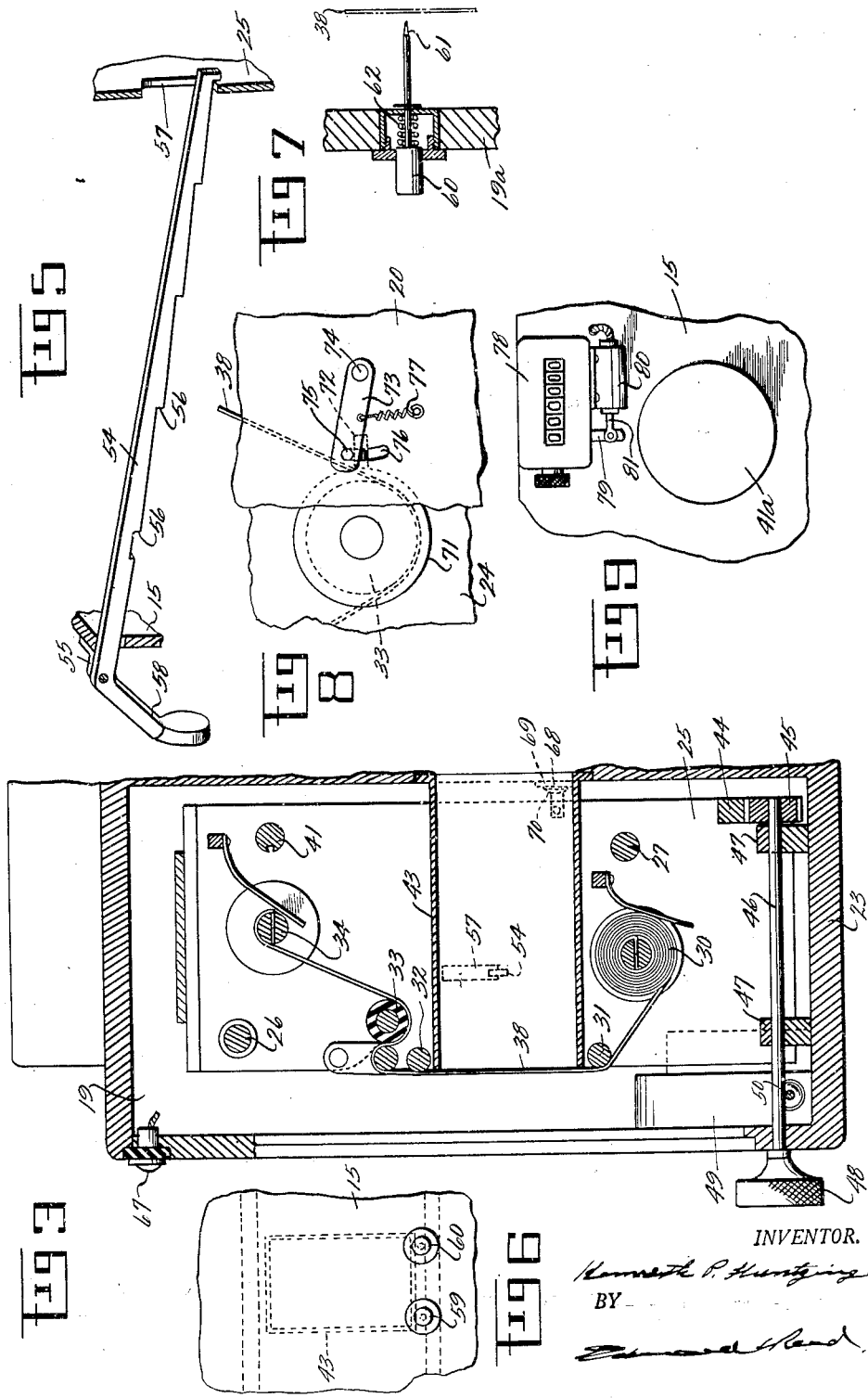

2,497,358

UNITED STATES PATENT OFFICE 2,497,358

CAMERA FOR MAKING SUCCESSIVE EXPOSURES ON A FILM TRANSVERSE TO THE LENGTH THEREOF

Kenneth P. Huntzinger, Pendleton, Ind.

Application March 15, 1947, Serial No. 735,012

4 Claims. (Cl. 95—37)

This invention relates to a camera, and more particularly to a camera of the type in which exposures are made in successive series, each series extending transversely to the length of the film, and the film being advanced after the completion of each series of exposures.

Such a camera includes a lens supporting structure and a film supporting structure, one of said structures being movable with relation to the other structure, and one object of the invention is to provide improved means for actuating the movable structure and for accurately positioning the same with relation to the other structure at the end of each movement thereof.

A further object of the invention is to provide means for automatically returning said movable structure to its initial position when it has been released from said positioning means.

A further object of the invention is to provide means for indicating to the operator at all times the position of the movable structure with relation to the other structure.

A further object of the invention is to provide means for automatically limiting the rewinding of the film.

A further object of the invention is to provide means for marking the film to indicate the end of one group of exposures and the beginning of another group of exposures.

A further object of the invention is to provide means for counting and registering the number of series of exposures as the film is advanced lengthwise from one position to another.

Other objects of the invention may appear as the camera is described in detail.

In the accompanying drawings, Fig. 1 is a rear elevation of a camera embodying the invention, with the rear closure removed; Fig. 2 is a transverse section taken on the line 2—2 of Fig. 1, partly in elevation and with the closure partly broken away; Fig. 3 is a section taken through the rear portion of the camera on the line 3—3 of Fig. 1, with the closure partly broken away; Fig. 4 is a sectional detail view showing the circuit breaker and closer for one of the signal lamps; Fig. 5 is a detail view of the carriage positioning and retaining device; Fig. 6 is a rear elevation of a portion of the rear closure showing the film marking devices; Fig. 7 is a sectional detail view of one of the film marking devices; Fig. 8 is a detail view of the stop mechanism for limiting the rewinding movement of the film; Fig. 9 is an elevation of the counter and its actuating device; and Fig. 10 is a diagram of the circuit for the signal lamps.

In these drawings I have illustrated one embodiment of my invention and have shown the film supporting structure mounted on the lens supporting structure and movable lengthwise of the latter, but it is to be understood that the camera as a whole, as well as the several parts thereof, may take various forms and that various features of the invention may be applied to a camera in which the lens support moves with relation to the film support, without departing from the spirit of the invention.

In the particular construction here illustrated, the lens supporting structure comprises a casing 15 rectangular in form and divided by a longitudinal vertical partition 16 into a compartment 17, in which the lens 18 is mounted, and a rear compartment 19 in which the film supporting structure is mounted. The rear wall of the casing is provided with a relatively large opening to permit access to the interior of the rear compartment and this opening is normally closed by a removable closure, a portion of which is shown at 19a. Mounted within the casing is a rigid frame comprising end members 20 and 21 connected one to the other by a top member 22 and rigidly secured to the base 23 of the casing. While the frame is here shown as separate from and secured to the casing, it will be obvious that it could be made a part of the casing.

The film supporting structure comprises a carriage movably mounted on the frame and here shown as comprising end members 24 and 25 slidably mounted on guide rods 26 and 27, the frame members being preferably provided with bearings 28 slidably mounted on the rods. The carriage is provided in its lower portion with means 29, of a known kind, for removably supporting therein a roll of film 30, the film being of a width somewhat less than the width of the carriage. The film is carried across lower and upper guide rods 31 and 32 and about a roller 33 to a rewinding spool 34 which is removably supported on the upper portion of the carriage by the usual spool supporting devices 35 and 36. The roller 33 maintains a proper tension in the film, which is indicated at 38, and is rotated by the film for a purpose which will hereinafter appear. The spool supporting member or gear 36 is connected by a pinion 39 with a gear 40 on a shaft 41 which is mounted on the frame 20, and to which the gear 40 is splined as shown at 42, the shaft 41 being actuated by a knob 41a, or the like, secured thereto exteriorly of the casing.

Mounted on the main frame, in line with the lens 18, is a housing 43 through which the light passes from the lens to the film, which is close to the rear end of the housing, and this housing defines the area on which the exposure is made. The carriage is moved lengthwise of the casing to bring successive portions of the film into line with the housing and the lens and thus enable a series of exposures to be made successively across the width of the film. Suitable means, operable from the exterior of the casing, are provided for advancing the carriage step by step to so position successive portions of the film in line with the lens. In the present arrangement this means comprises a rack bar 44 rigidly secured at its ends to the end members 24 and 25 of the carriage and meshing with a pinion 45 carried by a shaft 46 journaled in the bearings 47 secured to the base 23 of the casing. The shaft 46 extends beyond the rear wall of the casing and is provided with a suitable means for actuating the same, such as a knurled knob 48.

When the carriage has been advanced to the limit of its movement, it is automatically returned to its initial position, preferably by a suitable power operated means. In the present construction, the power operated means comprises a drum 49 with which one end of a flexible member, such as cable 50, is connected and the drum is provided with a spring 51 which tends to rotate the same in a direction to wind the cable 50 thereon. The other end portion of the cable extends about a pulley 52, mounted at that end of the casing opposite the drum 49, and is secured to the end member 24 of the carriage as shown at 53. Thus, as the carriage is advanced, to the left in Fig. 1, the cable is unwound from the drum and the spring 51 is placed under tension and tends to move the carriage toward its initial position.

Means are provided for holding the carriage against reverse movement by the spring means and for accurately positioning the successive portions of the film with relation to the casing 43 and the lens. As here shown, this means comprises an elongate member or bar 54 which extends through the end wall of the casing and is pivotally mounted on a bracket 55. This bar is provided with a plurality of shoulders 56, corresponding in number to the number of exposures to be made in each series, and arranged to have locking engagement with a part rigid with the carriage, and in the present instance the bar extends through an opening 57 in the end member 25 of the frame. The bar is here shown as extending through the end member 25 when the carriage is in its initial position at the right hand end of the casing. This enables the member 25 to limit the downward movement of the bar, but is otherwise unnecessary because the carriage is already at the right hand limit of its movement. The lower edge portions of the bar 54 between adjacent shoulders are inclined so that as the carriage moves to the left the inner end portion of the bar will be lifted to permit the shoulders 56 to successively pass over and then engage the member 25 at the bottom of the opening 57. When the end member 25 of the carriage has passed beyond any one of the shoulders 56 the bar will drop to bring that shoulder into engagement with the inner surface of the member 25, thus positively preventing the reverse movement of the carriage, by the spring means or otherwise. Should the carriage be moved further than was necessary to permit a shoulder of the bar to move to locking position, the carriage will be moved in a reverse direction into engagement with the shoulder, by the spring means, and will thus be accurately positioned with relation to the lens and will be retained in that position until it is again advanced by the actuating knob 48. When the carriage has been advanced to its final position and the final exposure of one series of exposures has been made the retaining bar 54 is moved about a pivotal axis to release the carriage for return movement by the spring means. This may be conveniently accomplished by a handle 58 rigidly connected with the retaining bar, at the axis thereof, on the outer side of the casing.

Cameras of this kind are commonly used for making individual photographs of a number of persons who may be included in one group or in a plurality of groups, and the names of the individuals of each group are listed in the order in which the exposures are made. It is often desirable to indicate on the film a dividing line between the exposures of two successive groups; for example, the dividing line between the exposures made of two classes of a school. It may further be desirable to also differentiate between exposures made at two different schools. This can be accomplished by placing a mark or marks on the film. These marks are preferably in the nature of small perforations in the film, at the edge of the exposure, which will not be removed or affected by the processing of the film. For this purpose, I have mounted in the rear closure for the casing two punches 59 and 60. These punches project inwardly to points adjacent the film and are provided with sharp points 61 so located with relation to the film that when pressed inwardly they will pierce the film at or close to the borderline below an exposure. As shown in Fig. 2, the punches are arranged to perforate the film just below the bottom wall of the housing 43. A spring 62 retains the punch normally in its retracted position and out of engagement with the film. In the present instance, the two punches are employed so that one or two perforations may be made in the film, thus indicating, for example, whether the line of division is between two classes or two schools.

A contact member 63 secured to the end wall 24 of the carriage is arranged to engage a second contact member 64 mounted on and insulated from the end frame member 20 when the carriage is in its fully retracted position. These contacts are connected in circuit with a signal 65 which is preferably in the nature of a small lamp mounted on the exterior of the casing and connected with a battery 66 in compartment 17 of the camera, one terminal of the battery being grounded on the frame. Thus, when the carriage has been returned to its initial position, this lamp is illuminated and serves to call the attention of the operator to the fact that the rewinding device should be operated to advance the film. It is also desirable that signals, such as lamps 67, be provided to indicate to the operator the exact position of the film with relation to the lens. For this purpose there is mounted on the exterior of the casing 15 a number of lamps equal to the number of exposures which can be made across the film. These lamps are connected with the battery 66 and are connected respectively with contact members 68 mounted on an insulating strip 69 on the partition 16 and arranged to be successively engaged by a contact member 70 mounted on the carriage and, in the present instance, on the forward edge of the end member 25 thereof. Thus, as the carriage moves from one position to another, the lamps are successively illuminated and the operator is at all times informed as to how many exposures have been made.

Means are provided for so controlling the operation of the rewinding mechanism by the knob 41a that the film will be advanced equal distances upon each complete rewinding operation. The roller 33 is provided with a friction surface, such as rubber, which will cause the same to be rotated by the movement of the film 38 without appreciable slippage. Mounted on the outer side of the end wall 24 of the carriage and connected with the roller for rotation thereby is a disc like member 71 which is provided with a radial projection, here shown as a pin 72. A member, such as an arm 73, is pivotly mounted at 74 on the outer side of the frame member 20 of the casing. A stud or pin 75 secured to the arm 73 at a point spaced from its pivotal axis extends through a slot 76 in the frame member 20. The pin 75 is biased toward the lower end of the slot 76, as by a spring 77 connecting the arm 73 with the frame member 20. The upper end of the slot constitutes a stop to limit the upward movement of the pin. The pin is of such length that when the carriage is in its initial position adjacent to frame member 20 the pin is in operative relation to the projection 72. When the carriage is spaced from the frame member 20 the pin will be in its lowermost position and the movement of the carriage to its initial position will cause the projection 72 to extend above the pin, so that the rotation of the roller by the rewinding mechanism will cause the projection to move about the axis of the roller 33 and to engage the lower side of the pin. The continued movement of the roller causes the projection to move the pin upwardly and into engagement with the upper end of the slot, this engagement taking place when the projection is in the position it occupied prior to the rotation of the roller. The rotation of the roller is thus positively interrupted and the movement of the film by the rewinding mechanism is either positively stopped or is so resisted by the roller as to inform the operator that a full rotation of the roller has been completed. The roller is of a circumferential length equal to the length of the film which is to be advanced upon each operation of the winding mechanism and consequently the film is advanced equal distances upon each such operation. When the carriage is moved from its initial position, in the making of another series of exposures, the pin is released and moves to the lower end of the slot so that the projection will extend above the same when the carriage is again returned to its initial position.

It is also desirable to register the number of exposures which have been made and this may be conveniently done by counting the number of movements made by the carriage lengthwise of the casing. For this purpose there is mounted on the casing a counter 78 and means are provided for advancing the counting mechanism one unit upon each return of the carriage to its initial position. The counter is of a well known construction and includes an actuating member 79 each oscillation of which will advance the counter one unit. The member 79 is operated by electrical means such as a solenoid 80, the plunger 81 of which is pivotly connected with the actuating member 79. The solenoid is connected in circuit with the battery 66 and is connected with the contact 64 which is mounted on and insulated from the frame member 20. The contact 63 on the end wall 24 of the carriage, on which the circuit is grounded, engages the contact 64 upon each return movement of the carriage to its initial position and thus energizes the solenoid to cause the operation of the counter. The circuit is provided with a manually operated switch 82 by which the circuit for the contacts 63 and 64 and for the lamps may be opened when the camera is to remain idle for a substantial period of time.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent is:

1. In a camera, a casing, a lens supported by said casing, a carriage mounted in said casing for movement lengthwise thereof and having means for supporting a film, spring means acting constantly on said carriage to move the same to and yieldingly retain the same at the limit of its movement in one direction, means manually operable from the exterior of said casing for moving said carriage step by step in the other direction and against the action of said spring means to position successive portions of said film in line with said lens, a retaining bar pivotally mounted on an end wall of said casing, extending inwardly therefrom across a part of said carriage and biased toward said part, said bar having a longitudinal series of shoulders to successively engage said part of said carriage as the latter is moved against the action of said spring means and prevent the movement of said carriage by said spring means, said bar having inclined edge portions between adjacent shoulders to engage said part of said carriage and elevate said shoulders and permit said part of said carriage to pass beneath said shoulders successively, and means for actuating said bar to release said carriage for movement by said spring means.

2. In a camera, a casing, a lens supported by said casing, a carriage mounted within said casing for movement lengthwise thereof and having means for supporting a film, a guide mounted on said casing adjacent the limit of movement of said carriage in one direction, a drum rotatably mounted on said carriage adjacent the limit of movement of said carriage in the other direction, a cable connected with said drum, extending about said guide and connected with said carriage, spring means for rotating said drum in a direction to wind said cable thereon and move said carriage toward said guide, means operable from the exterior for said casing for moving said carriage step by step in the other direction and against the action of said spring means to position successive portions of said film in line with said lens, a releasing device supported in said casing and having parts to successively engage said carriage and prevent the reverse movement thereof by said spring means, and means operable from the exterior of said casing to disengage said retaining device from said carriage and release the latter for movement by said spring means to the limit of its movement in the first mentioned direction.

3. In a camera, a lens supporting structure, a carriage mounted on said structure for movement lengthwise thereof, means for supporting a film on said carriage and for moving said film in the direction of its length, said means including a roller driven by said film, a stop on a fixed part of said structure adjacent one end thereof, a stud mounted on said part of said structure for a movement into engagement with said stop and biased toward a position spaced from said stop, a projection carried by and rotatable with said roller and arranged to extend into operative relation with said stud when said carriage is at the limit of its movement towards said end of said structure, to be moved by said roller into engagement with said stud and to move the latter into engagement with said stop, and to be withdrawn by the movement of said carriage from said end of said structure to release said stud for movement from said stop.

4. A camera, a casing, a lens carried by said casing, a carriage mounted in said casing, means for moving said carriage lengthwise of said casing to position successive portions of said film in line with said lens and for returning said carriage to its initial position, means for supporting a film on said carriage including a rewinding device to advance said film and a roller driven by said film, a member supported on said carriage and connected with said roller for rotation thereby and having a projection spaced radially from the axis of said roller, said casing having near the initial position of said carriage an upright wall provided with a slot, an arm pivotally mounted on that side of said wall opposite said carriage, a stud carried by said arm and extending through slot, means urging said stud toward one end of said slot, said stud being of such length that it will extend into the path of rotation of said projection when said carriage is in said initial position and will be moved by said projection into contact with the other end of said slot when said roller is rotated by said film, and will be released for movement to its normal position when said carriage is moved from said initial position.

KENNETH P. HUNTZINGER.

REFERENCES CITED

The following references are of record in the file of this patent:

UNITED STATES PATENTS

| Number | Name | Date |
| --- | --- | --- |
| 2,172,283 | Kirby | Sept. 5, 1939 |
| 2,259,084 | Rosenhaft | Oct. 14, 1941 |
| 2,335,189 | Mayer | Nov. 23, 1943 |
| 2,348,457 | Drehs | May 9, 1944 |
| 2,369,981 | Reyniers | Feb. 20, 1945 |
| 2,386,276 | Simjian | Oct. 9, 1945 |

FOREIGN PATENTS

| Number | Country | Date |
| --- | --- | --- |
| 9,729 | Great Britain | May 9, 1905 |
| 460,718 | Great Britain | Feb. 2, 1937 |